United States Patent [19] [11] Patent Number: 4,974,724
Lapeyre [45] Date of Patent: Dec. 4, 1990

[54] CONVEYOR BELT WITH A CONNECTING MEMBER DRIVE

[75] Inventor: James M. Lapeyre, New Orleans, La.

[73] Assignee: The Laitram Corporation, New Orleans, La.

[21] Appl. No.: 302,014

[22] Filed: Jan. 26, 1989

Related U.S. Application Data

[63] Continuation-in-part of Ser. No. 105,011, Oct. 6, 1987.

[51] Int. Cl.$^5$ .............................................. B65G 17/06
[52] U.S. Cl. ..................................... 198/853; 198/834
[58] Field of Search ........................ 198/851, 853, 834

[56] References Cited

U.S. PATENT DOCUMENTS

| | | | |
|---|---|---|---|
| 2,852,129 | 9/1958 | Conner | 198/853 |
| 4,006,817 | 2/1977 | Paul | 198/853 |
| 4,159,763 | 7/1979 | Kewley et al. | 198/853 |
| 4,213,527 | 7/1980 | Lapeyre et al. | 198/853 |
| 4,345,730 | 8/1982 | Leuvelink | 198/853 |
| 4,556,142 | 12/1985 | Lapeyre | 198/853 |
| 4,832,187 | 5/1989 | Lapeyre | 198/853 |

Primary Examiner—Joseph E. Valenza
Attorney, Agent, or Firm—Laurence R. Brown

[57] ABSTRACT

A module for forming a conveyor belt which uses the center transverse connecting member to receive a driving force from an intermeshed sprocket is disclosed. Each of the modules is suitable for being pivotally connected with a multiplicity of similar modules by pivot rods to construct a conveyor belt. Each of the modules includes a plurality of elongated links which extend the length of the module and which define a pivot hole at each end which are aligned in the module to form first and second pivot axes. The elongated links of each of the modules are joined by an integrally molded connecting structure which extends transvers to the elongated links so as to maintain and join the relative position of the elongated links with respect to each other. The transverse member or connecting structures further define driving surfaces on opposite sides for receiving a driving force to move the module and the belt constructed from a multiplicity of the modules in two selected and opposite directions. In a preferred embodiment, the elongated links are selectively spaced by means of spacers integrally molded to one side surface of one of the plurality of link ends and a second group of spacers which are integrally molded to the other side surface of the second plurality of link ends. This maintains one side of the elongated links in contact with the opposite side of an elongated link of a pivotally connected module thereby allowing end-to-end reversability.

13 Claims, 3 Drawing Sheets

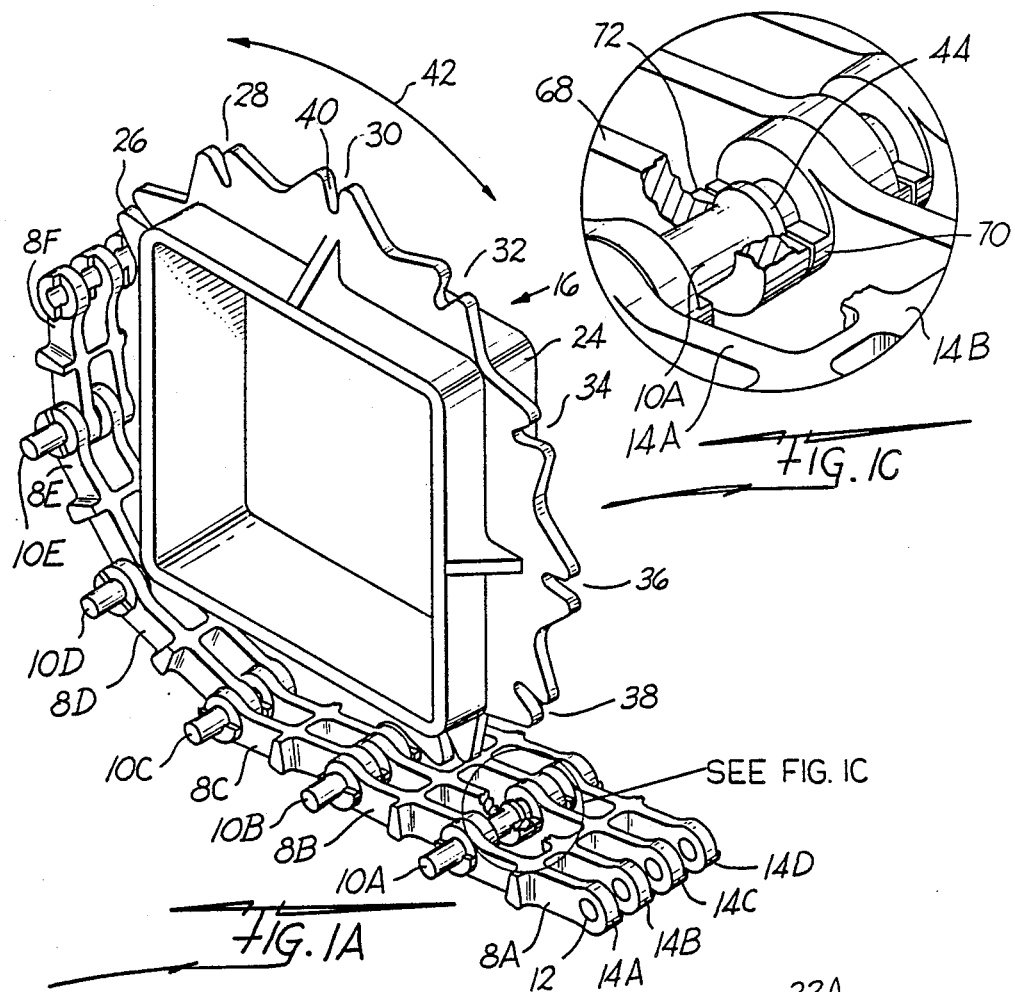
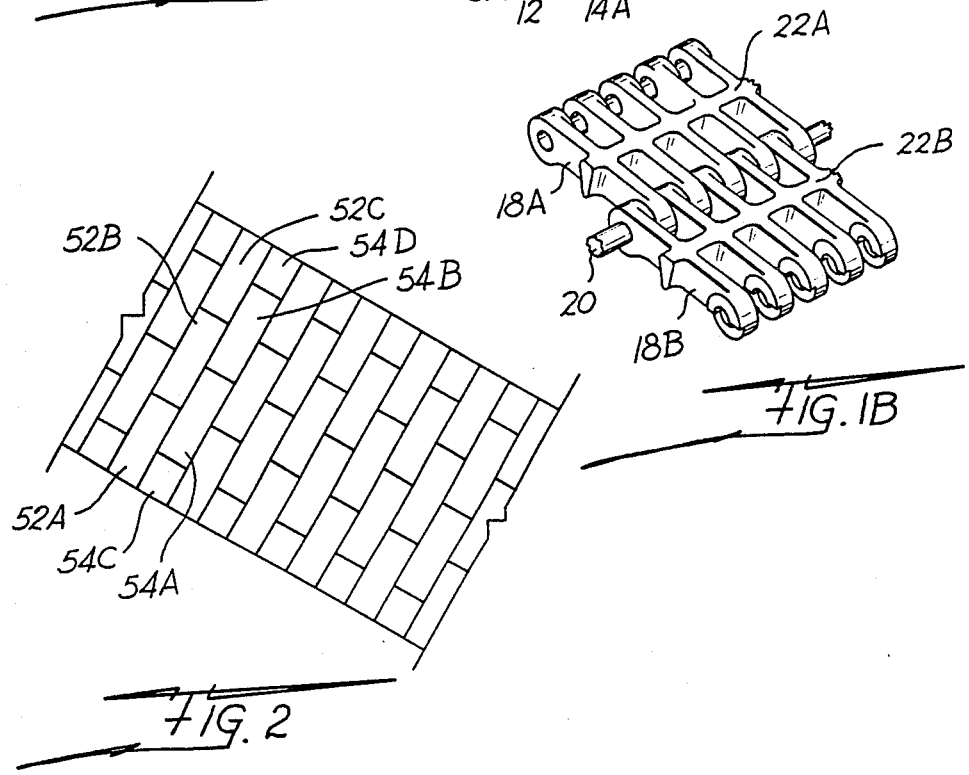

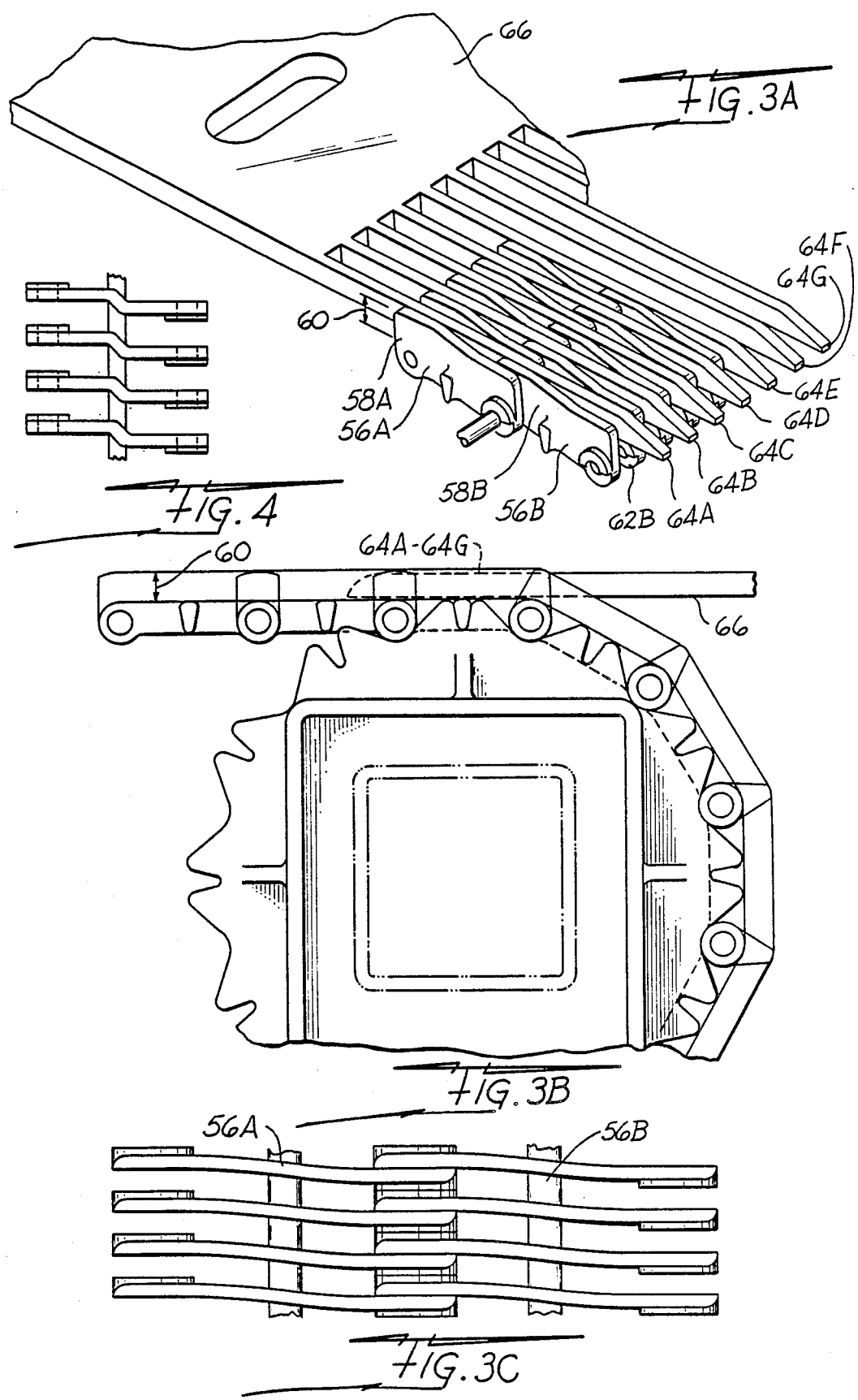

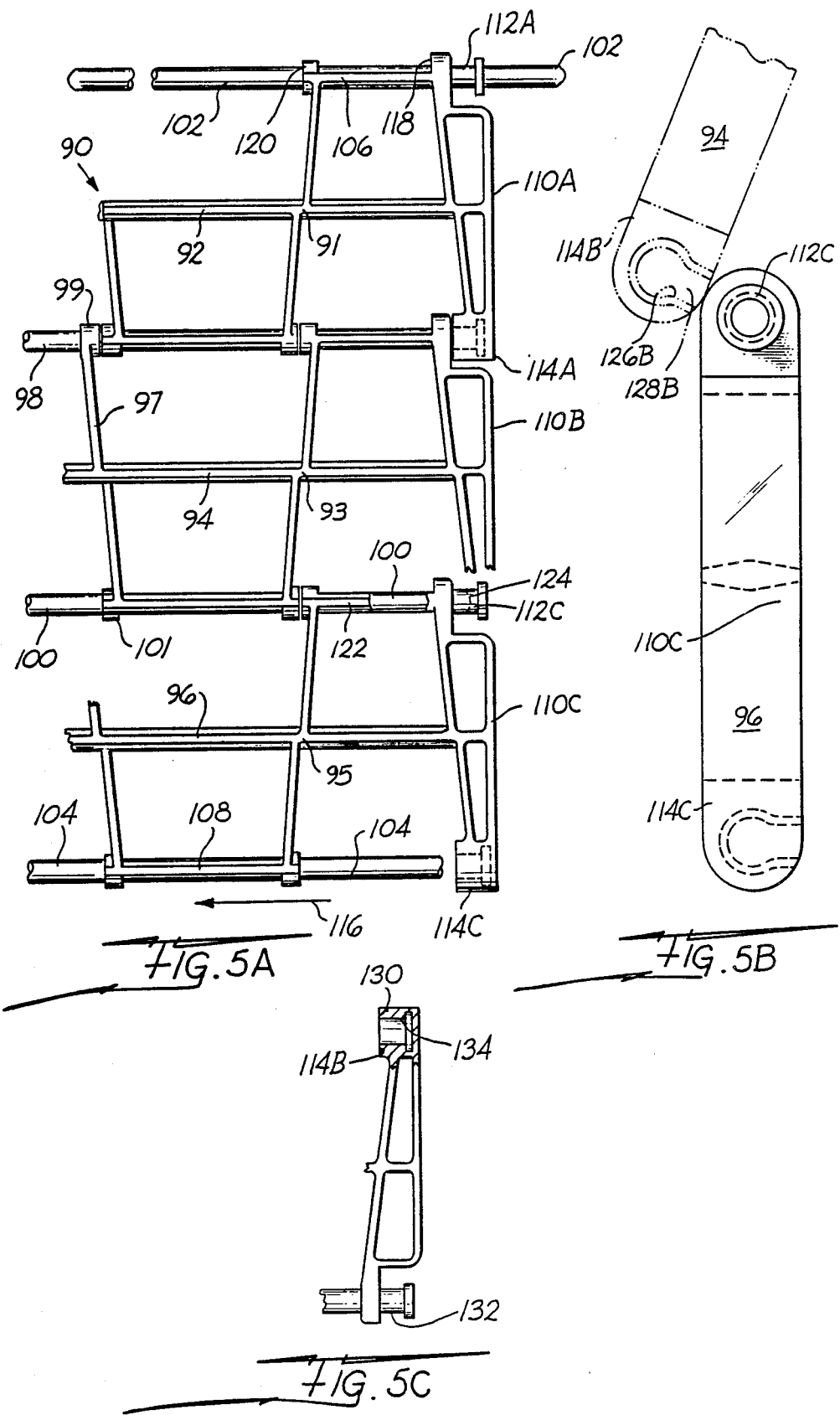

CONVEYOR BELT WITH A CONNECTING MEMBER DRIVE

This application is a "Continuation-In-Part" of U.S. application Ser. No. 105,011 filed Oct. 6, 1987.

TECHNICAL FIELD

This invention relates to a new and simple to manufacture conveyor belt which uses a single transverse running member or structure as the means for driving the conveyor and for joining individual links. More particularly this invention relates to such a conveyor belt which includes a plurality of individual modules pivotally joined by pivot rods. The modules are the type preferably formed by injection molding and which include a first and second plurality of pivot ends which are intermeshed with pivot ends of other modules and the intermeshed pivot ends are held together by the pivot rods. The particular belt of this invention, is driven by a sprocket which in a preferred embodiment contacts the transverse member substantially at the center of the pitch line of each module.

BACKGROUND

A typical modular conveyor belt is disclosed in U.S. Pat. No. 3,870,141 issued to J. M. Lapeyre on Mar. 11, 1975. According to this patent, substantially indentical modules formed by injection molding are pivotally connected to one another to form a conveyor belt of a desired length. Each module includes a plurality of elongated elements, and each elongated element has a first pivot end and a second pivot end. The plurality of elongated elements are joined together such that the apertures defined in each of the first and second pluralities of pivot ends lie along a first and second pivot axis respectively which are parallel one to the other. The link ends of one module are intermeshed and pivotally connected by means of a pivot rod to the link ends of another module until an entire belt having the desired length is formed. Injection molded plastic belts built according to the teachings of this patent have been well received by industry and have many uses.

U.S. Pat. No. 4,171,045 issued on Oct. 16, 1979 also to J. M. Lapeyre, recognized the need for including a conveyor surface which would not allow objects riding on the conveying surface to slip and thereby allow the belt to pass underneath. A belt disclosed and constructed according to the teachings of the U.S. Pat. No. 4,171,045, is similar to that of the U.S. Pat. No. 3,870,141 patent discussed heretoforth and U.S. Pat. No. 4,051,949 also issued to Lapeyre except that selected ones of the elongated members include a plurality of "dogs" which extend above the normal portion of the conveying surface to contact and push articles on the conveying surface along such that the belt will not slip underneath.

In a similar manner, U.S. Pat. No. 4,213,527 issued June 22, 1980 to J. M. Lapeyre, et al, further discloses a module for forming a link conveyor belt which has ridges or flight members extending transverse to the direction of travel for preventing the conveyor belt from slipping under articles riding on the conveyor belt surface. Similarly U.S. Pat. No. 4,170,281 issued on Oct. 19, 1979 and U.S. Pat. No. 4,080,842 issued on Mar. 22, 1978, both to Lapeyre, also show conveying belts having members extending transverse to the conveying surface for moving articles on the conveying surface along the belt such that the belt cannot slip underneath the article. U.S. Pat. No. 4,084,687 issued Apr. 18, 1978 to J. M. Lapeyre dislcoses a conveyor belt patent not particularly relevant to the present invention wherein the top surface is resilient or flexible, and very slick.

Other modular link conveyor belt patent applications or patents by J. M. Lapeyre and/or owned by the same assignee as the present invention include:

Ser. No. 483,210 entitled "Link Chain Belt" filed Apr. 14, 1983; Ser. No. 179,523 entitled "Modular Center Drive Conveyor Belt" filed Aug. 19, 1980; and U.S. Pat. No. 4,556,142 entitled "Lightweight Modular Conveyor Belt" issued Dec. 3, 1985.

In addition, a patent application entitled "End-to-End Molded Conveyor Belt Module" filed Oct. 15, 1987 and having Ser. No. 110,109 discloses subject matter having some similarity to the present invention in that modules of certain embodiments of this invention may be "end-to-end" molded in a manner similar to that discussed in the earlier application.

A conveyor belt designed particularly for changing horizontal directions or flexing is disclosed in U.S. Pat. Nos. 4,153,152 and 4,184,588 also issued to J. M. Lapeyre on May 8, 1979 and Jan. 22, 1980 respectively.

In addition, U.S. Pat. No. 4,597,747 issued to Lapeyre on July 1, 1986 discloses a snap-together link chain which includes a center member which joins the two receiving legs of the first link end to the single post of the second link end. The center member also provides driving surfaces which cooperate with a sprocket. According to one embodiment, a multiplicity of the chain links are joined together side-by-side by a pair of integrally molded connecting members to form a wide module. However, neither of the two connecting members also function as a single bidirectional drive member, although in one embodiment the two connecting members do define a recess for receiving a driving tooth in the same manner as the Cam Clean ® belts sold by The Cambridge Wire Cloth Company of Cambridge, Md. discussed below with respect to U.S. Pat. No. 4,557,374

The "All-in-One" ® conveyor belt manufactured by the KVP Company in Sacramento, Calif. and illustrated in FIG. 4 of U.S. Pat. No. 4,742,907 issued May 10, 1988 to Karl V. Palmaer, is a modular plastic belt driven at a central transverse connecting member which can be brick-layed, and therefore can be provided in different widths. However, this belt can be driven in only one direction, and does not include continuous elongated links which extend from pivot axis to pivot axis.

The plastic modular belt sold by the Cambridge Wire Cloth Company of Cambridge, Md. under the name of Cam-Clean ® mentioned above and substantially described in U.S. Pat. No. 4,557,374 issued on Dec. 10, 1985 to Robert H. Bode is driven in the center area of a module by a sprocket tooth received by a recess in the module defined by a pair of transverse connecting members.

Thus, a review of the prior art patents and commercial belts as well as pending applications of the assignee of the present invention reveals that to date there has not been a simple and inexpensive modular conveying belt particularly designed with the unique features of this invention. More particularly, none of the prior art conveying belts are capable of being driven in both directions, have the strength of a continuous elongated link extending from pivot axis to pivot axis, and are brick-layable such that the belt can be constructed to any desired width and length. Therefore, it is an object of this invention to provide a module which can be brick-layed to construct a wide conveyor belt, and which is simple, easy to clean and inexpensive to construct and use.

It is another object of the present invention to provide a module for forming a conveyor belt which is modular and has the inherent capability of being easily repaired and replaced.

It is yet another object of the present invention to provide modules for forming a conveyor belt which is suitable for being driven in both directions.

It is also an object of the present invention to provide a conveyor belt which is simple, easy to clean, inexpensive to construct, drivable in both directions, and which can cooperate with the teeth of a comb to transfer objects to and from the belt.

DISCLOSURE OF THE INVENTION

Other objects and advantages will be obvious, and will in part appear hereinafter and will be accomplished by the present invention which provides a module for forming a conveyor belt which is driven substantially at the center of the module and which is formed of a plurality of modules which are pivotable connected. The modules are preferably formed by the injection molding of a plastic material such as polyethylene, polypropylene, or acetal. Each module has a top surface and a bottom surface and includes first and second pluralities of link ends joined by a connecting structure or traverse member integrally molded with the link ends. Each link end of the first and second pluralities of link ends defines a pivot aperture, and the pluralities of pivot apertures in turn define first and second pivot axes. In the preferred embodiment of this invention the elongated links extend continuously from pivot axis to pivot axis, with a slightly orthogonal component such that the first plurality of link ends are offset one link width with respect to the second plurality of link ends. In addition, the connecting transverse structure or member, has driving surfaces on both sides such that the module can be driven in either direction. The length of each module is determined by the length of the elongated link elements and the width of the module is determined by the number of elongated link elements joined together by the centrally located connecting structure or member. Since the first and second pivot axes defined by the first and second pluralities of link ends are parallel, these axes lie in a common plane. The thickness of at least a portion of each of the pivot ends which surrounds the pivot axis is less than the spacing between adjacent pivot ends so that the pivot ends of one module may be intermeshed and connected with the pivot ends of another module by means of a pivot rod when the pivot axis of the two modules are aligned coaxially.

In a preferred embodiment, the spacing between the thickest portions of adjacent pivot ends is somewhat greater than the width of a pivot end such that pivot ends of intermeshed modules can be pivotally connected. The modules also include a means for receiving a driving force which is applied orthogonal, or the driving force at least has a vector applied orthogonal, to the pivot axis and substantially parallel to the common plane for purposes of moving the modules. Consequently, a belt formed of a plurality of modules will be moved in a direction perpendicular to the parallel pivot axis. According to this invention, the means for receiving the driving force comprises a connecting member which is integrally molded with, located about midway between the two pivot axes and which extends transverse to the pivot ends. In addition, the connecting member lies substantially completely above the bottom surface of the link such that very little or none of the connecting structure or member extends below the bottom surface of the module. Thus, the drive sprocket is uniquely formed such that a recess for emcompassing the tranverse connecting member is defined in each sprocket tooth which in turn extends between the selected pairs of the parallel and elongated links of a module.

BRIEF DESCRIPTION OF THE DRAWINGS

The above features of the present invention will be more clearly understood from consideration of the following description in connection with accompanying drawings in which:

FIGS. 1A and 1B are perspective views which illustrate the unique connection member drive technique conveyor belt of this invention.

FIG. 1C illustrates one embodiment for retaining a pivot pin in position after fabricating a belt from modules incorporating features of this invention.

FIG. 2 is a diagramatic sketch showing how the belt of this invention may be brick-layed to form a belt of any selected width.

FIGS. 3A, 3B and 3C represent a perspective view, a side view, and a top view of an embodiment of modules comprising a belt according to the teachings of this invention for transferring items to and from the belt.

FIG. 4 is a top view of another embodiement of modules for transferring items to and from the belt.

FIGS. 5A, 5B and 5C represent top, side and bottom views of another embodiment of modules incorporating the teachings of this invention.

BEST KNOWN MODE FOR PRACTICING THIS INVENTION

Referring now to FIGS. 1A and 1B, there is shown a plastic modular conveyor belt being driven by a cooperating sprocket which belt and sprocket incorporate the features of this invention. As shown, a series of modules 8A, 8B, 8C, 8D, 8E and 8F are pivotally connected or joined by means of pivot rods 10A, 10B, 10C, 10D and 10E which extend through apertures such as aperture 12 defined in the end of elongated link 14A of module 8A. The modules 8A through 8F as shown in FIG. 1A are illustrated with only 3 or 4 elongated links such as elongated links 14A, 14B, 14C and 14D of module 8A. However, it will be appreciated that a belt typically could be substantially wider than 4 elongated links, and each module could have a significantly larger number of elongated links such as for example on the order of 20 or more elongated links. In addition, as will be discussed hereinafter with respect to FIG. 2, a series of modules may themselves be laid side-by-side to form a belt even wider than a single module. In the embodiment of FIG. 1A, a bottom view of the modules is shown to better illustrate the manner in which the modules intermesh with a drive sprocket 16. FIG. 1B on the other hand, illustrates a top prospective view which shows modules 18A and 18B joined by a pivot rod 20, and which are not intermeshed with the sprocket. It will be appreciated of course that modules 18A and 18B could be a part of the conveyor belt which also includes modules 8A through 8F. Referring again to FIG. 1B, it should be noticed that each of the modules include a single transverse or connecting member or structure such as connecting structure 22A of module 18A and 22B of module 18B. As will be appreciated by those skilled in the art, this connecting member holds the individual links together and in a parallel relationship with each other such as links 14A through 14D of FIG. 1A. As will be appreciated, one of the main functions of the cross-members such as cross-members 22A and 22B is to maintain the links in a relative position in a module which may have 20 or more of the elongated links. Thus, fabrication of a belt by using modules already preassembled in this manner is substantially easier than if the links were not connected. However, according to the features of this invention, connecting members 22A and 22B also serve an important function not found in earlier belts. The transverse members or connecting members 22A and 22B also serve in a unique way as a means for applying the orthogonal force by a drive sprocket to the belt to cause movement of the belt. As shown in FIG. 1A, it is seen that drive sprocket 16 includes a hub member 24 by which a rotational force imparts rotation to the sprocket 16. Also as shown in the embodiment of FIG. 1A, a series of tooth members such as tooth members 26, 28, 30, 32, 34, 36 and 38 are located around the periphery of the sprocket. Using tooth 30 as an example, it is seen that each of the tooth members define a recess such as recess 40. And as can be seen by referring to the drawing of FIG. 1A, the recesses defined by these tooth members, such as recess 40 straddles the transverse member located between two elongated links and is thereby able to provide a driving force in either direction such as is indicated by the double-headed arcuate arrow 42. More specifically, the sprocket provides a driving force having at least a vector which is orthogonal to the direction of travel such that the belt will be propelled in the desired direction. To avoid scrubbing of the transverse member as it enters and leaves the recess 40 of a sprocket tooth member, it will be appreciated that the cross-section of the transverse members has a substantially trapezoidal shape which cooperates with the similar trapezoidal shape of recess 40 defined in the sprocket teeth. It will be appreciated by those skilled in the art that by fabricating the recesses 40 very wide with respect to the thickness of the transverse members it may be possible to achieve a workable but sloppy interface between the recess of the transverse member even if the sides of the recesses and the sides of the transverse members are perpendicular to the long dimension of the elongated members. However, to achieve a satisfactory working engagement or interface of the transverse or cross-member within the recess 40 of a tooth, the cooperating trapezodial shape is preferred. It should also be noticed that unlike other conveyor system which use downwardly extending teeth on the individual modules, the cross-members or transverse members do not extend below the lowermost point of the elongated links which define a module. Thus, wear of the tooth member is substantially reduced and the bottom of the module is substantially flat which facilitates the support of the assembled conveyor belt.

Referring to modules 8A and 8B, which are connected by pivot rod 10A, it can be seen there is a blown-up view illustrated further in FIG. 1C which shows a simple and effective way of preventing the pivot rod 10A from travelling along its axes in either direction and consequently allowing the modules to become disconnected. As shown, pivot rod 10A is deformed as indicated by the raised portion or "smile" portion on the pivot rod 44 which results in a larger diameter than the apertures defined in the pivot ends of each link. Thus, this raised or deformed part prevents the axial movement of the pivot rod. This deformity on the pivot rod may readily be made by the use of a sharp edged hot soldering iron.

It will be understood, of course, by those skilled in the art that conveyor belts are required to be in all sizes of width and length to accomplish various types of conveying needs. Consequently, it is highly desirable that the belting system by made of modules or units which can be placed together in an end-to-end and side-by-side relationship so as to form a belt of any width and length.

FIG. 2 illustrates how a belt of the type shown in FIGS. 1A and 1B may be made of identical modules having a single width along with a few partial or half modules so as to form a belt three modules wide but which also has substantially the strength of a single module across the belt. The strength of the belt is achieved as a result of the intermeshing and interlocking of the pivot ends. As shown, the full length modules 52A, 52B and 52C are simply laid side-by-side across the width of the belt. Each row on both sides of the modules comprised of modules 52A, 52B and 52C include two full size modules such as modules 54A and 54B and two partial modules such as 54C and 54D. When this brick-layed pattern is continued for the length of the belt, the belt has substantially more strength across its width than it would without the brick-laying.

Referring now to FIGS. 3A, 3B and 3C, there is shown a perspective view, a side view and a top view respectively of another embodiment of the present invention which is useful for transferring items to and from the belt. As shown in FIG. 3A, there are a pair of joined modules substantially similar to those discussed above with respect to FIG. 1B. However, modules 56A and 56B also include a raised portion 58A and 58B which extends above the top of the cross member as is indicated by the double-headed arrow 60. Also as was the case discussed with respect to FIGS. 1A and 1B, the elongated links which extend from one pivot hole across the cross-member to a second hole are not directly in line. That is, there is a slight offset in the elongated link equivalent to the thickness of a link such that when the modules are intermeshed, the first plurality of link ends of each module is aligned with the first plurality of link ends of every other pivotally connected module. In a similar manner, each second plurality of link ends of a module is aligned with each second plurality of link ends of every other pivotally connected module. However, the first plurality of link ends are not in line with the second plurality of link ends of any module.

In the embodiment of FIG. 3B, it can be seen that the raised portions 58A and 58B of the elongated links also include an offset such that the raised portion or as commonly called the "raised ribs" overlap at the pivot rod. However, it will also be noticed that in this embodiment the spacing between two elongated links such as links 58A and 58B is substantially greater than the width of a rib itself. Consequently, there is a space between every pair of intermeshed raised ribs which is wide enough to allow the teeth 64A through 64G of a transfer comb 66. Thus, as will be appreciated by those skilled in the art the transfer comb allows for the removal or placement on the belt of items such as bottles, cans, etc.

FIG. 4 shows another embodiment similar to that discussed with respect to FIG. 3A, except that the offset in the raised ribs and elongated links is more abrupt and does not occur as gradually as that shown in the FIGS. 3A through 3D. Although the embodiments shown have illustrated ribs or raised portions on each of the elongated links, it would also of course be possible to mold the modules so that only one out of every three links or the like includes the top raised rib portion. Such an arrangment however would require a much wider teeth on the comb and although intended to be within the scope of this invention is not believed to be as suitable as the preferred embodiment for most applications. However, in either embodiment the cooperation of the teeth of the comb with the raised rib does allow for greatly improved transfer of products to and from a belt comprised of modules of this invention.

Referring again to FIGS. 1A and 1C, it can be seen that in this embodiment, each link end of the elongated links, such as elongated links 14C and 68 include a boss or spacer means, such as the half circle spacer means 70 and 72 respectively. These spacers maintain the proper positioning of the linked modules with respect to each other and decrease bending of the pivot rods because of the close spacing. In addition, the half moon bosses which are only on the top side of the module in this embodiment allow for easy cleaning of the belt.

Referring now to FIGS. 5A, 5B and 5C there is shown still another embodiment of the present invention incorporated into a module used in fabricating very light weight and open area conveyor belts, such as the portion of a conveyor belt indicated generally at 90. As shown, the belt 90 includes integrally molded modules 91, 93 and 95 having connecting structures or members 92, 94 and 96 respectively and typically connected by pivot rods 98 and 100. To aid in understanding this embodiment, pivot rods 102 and 104 are also shown in position in the link ends of modules 91 and 95 respectively, but are not shown as connecting other modules. Unlike the previously discussed embodiments, in addition to the centrally located structures between elongated links, such as elongated link 97 extending between link ends 99 and 101, there is also included a link end connecting structure such as connecting members 106 and 108 of modules 91 and 95. In the same manner as was discussed heretofore with other embodiments, the centrally located connecting members 92, 94 and 96 include driving surfaces on each side such that the module or a belt made from a multiplicity of the modules may be driven in two directions. Also, as shown, edge members 110A, 110B and 110C are integrally molded to each module. Each edge member 110A, 110B and 110C includes a support structure such as sleeve portion 112A and 112C, and an obstruction abutment or stop member such as 114A and 114C. In the embodiment as shown, modules of belt 90 are assembled by inserting the pivot rod through the intermeshed link ends in a direction as indicated by arrow 116. However, as will become clear hereinafter, the stop member portion of a module edge must be deformed or bent out of the way to allow insertion of the pivot rod into and through the sleeve portion and the link ends. As shown, in FIGS. 5A and 5B, the obstruction portion, abutment or stop member of a module edge is bent or deformed out of the usual position, and a rod such as rod 102 is passed through a sleeve and the link end, such as sleeve 112A and the apertures in link ends 118 and 120 of module 91, in the direction indicated by arrow 116. Once the rod is fully inserted in position, the stop member or abutment portion of the adjacent module returns to its normal or undeformed position surrounding the sleeve portion so as to prevent the rod from moving in a direction opposite that indicated by arrow 116. This is indicated by abutment or stop member portion 114A of module 91, surrounding the sleeve portion (not visible) of edge 110B of module 93 to prevent pivot rod 98 moving out of its connecting position. The broken out area of link end connecting member 122 of module 95 and dashed lines 124 show how pivot rod 100 may extend substantially to the end of sleeve 112C such that it would be almost in contact with the stop member portion (broken away and not shown) of edge 110B of module 93. On the other hand, it can be seen that the pivot rod may terminate well short of the abutment or stop member without detrimental effect as is indicated by pivot rod 104 and abutment or stop member 114C. FIG. 5B illustrates how the abutment or stop member portion 114B broken away and not shown in FIG. 5A) of module 93 may be bent out of the way of sleeve portion 112C of module 95, and how the obstruction, abutment or stop member portion 114B includes a keyhole shaped cut-out proving a passage 126B from the bottom-most edge portion 128B of edge 110B such that the obstruction or stop member portion 114B can snap around and surround the sleeve 112C when it returns to its normal and undeformed position. As can better be seen from the bottom view of FIG. 5C, the cylindrical receiving recess portion 130 indicated by dotted lines is substantially the same diameter, or somewhat greater than the diameter of the sleeve portion 132 of the same and other modules. The cut-out or passageway to the cylindrical portion, such as passageway 134 and passage 126B of module 93, however, is equal to or slightly less than the diameter of the sleeve 112C of module 95 such that the stop member portion 114B of module 93 snaps around and surrounds the sleeve portion 112C of a pivotally connected module 95. Thus, it can be seen that according to this embodiment, a smooth edge is provided and headless pivot rods are completely restrained from axial movement out of a connecting relationship without the use of separate or unattached plugs and/or obstructions.

Thus, although there has been described to this point particular embodiments of modules for forming conveyor belts which use a single central transverse member for both joining the belts and providing a driving means, it is not intended that such specific references be considered as limitations upon the scope of this invention except in- so-far as set forth in the following claims.

I claim:

1. A module having a top surface and first and second groups of link ends suitable for being pivotally connected with a multiplicity of similar modules by pivot rods to construct a conveyor belt which can move along a predetermined path, said module comprising:
   a plurality of elongated links extending the length of the module said elongated links including a link end of said first group joined to a link end of said second group by an elongated member extending therebetween, said link end of said first group defining a first pivot hole aligned along a first pivot axis and said link end of said second group defining a second pivot hole aligned along a second pivot axis said elongated member defining a substantially flat bottom surface and a flat top surface and having a substantially constant cross-section;

said first group of link ends of said module suitable for being intermeshed and pivotally connected by pivot rods extending through said pivot holes with said second group of link ends of a similar module to form a conveyor belt;

a single centrally located integrally molded connecting structure extending transverse to and between adjacent ones of said elongated members so as to join and maintain the relative position of said elongated links with respect to each other, said connecting structure having a bottom-most point which terminates substantially at said flat bottom surface and a top most point which does not extend above said flat top surface; and driving surfaces defined by said connecting structure and located between selected adjacent ones of said plurality of elongated members and above said flat bottom surface of said elongated member, said driving surface suitable for receiving a driving force to move said module and a conveyor belt constructed from a multiplicity of such modules in a selected direction.

2. The module of claim 1 wherein said driving surfaces are defined on opposite sides of said connecting structures so that said module and conveyor belt can be moved in two selected and opposite directions.

3. The module of claim 1 and further including a raised portion integrally molded to the top surface of said first and second pluralities of link ends said raised portion defining channels parallel to the predetermined path of said module for receiving the teeth of a comb to remove articles from said module.

4. The module of claim 1 wherein every other one of the elongated links further include an integrally molded raised portion having a top surface which defines a plane above the plane of the top surface of the other elongated links thereby providing channels for receiving the teeth of a comb to remove articles from said article.

5. The module of claim 1 wherein said elongated links are selectively spaced and further include an integrally molded raised portion having a top surface which define a plane above the plane of the top surface of said connecting structure thereby providing channels for receiving the teeth of a comb to remove articles from said module.

6. The module of claim 1 wherein said elongated links comprise first and second groups, said elongated links of said first group having upper surfaces which define a plane above the upper surface of said second group so as to form a plurality of channels for receiving the teeth of a comb to remove articles from said modules.

7. The module of claim 1 wherein the end most portion of selected link ends have a thickness which is greater than the thickness of other portions of said link ends.

8. The module of claim 1 and furthering comprising a first group of spacers integrally molded to a selected side surface of selected ones of said first plurality of link ends, and a second group of spacers integrally molded to the other side surface of selected ones of said second plurality of link ends so as to maintain one side of said elongated links in contact with the opposite side of an elongated link of a pivotally connected module, and such that the module is end-to-end reversible.

9. The module of claim 1 wherein said elongated links include a portion thereof which is not orthogonal to said pivot axis.

10. A linked conveyor belt constructed from a multiplicity of modules of claim 1 aligned end-to-end with said first group of link ends of each module meshed between said second group of link ends of another module such that said first and second pivot axis are in alignment, and further comprising a multiplicity of pivot rods extending through said pivotal apertures of said meshed link ends.

11. The linked conveyor belt of claim 10 wherein said multiplicity of modules are also aligned side-by-side in brick-layed fashion to form a conveyor belt having a width which is greater than the width of a single module.

12. A modular conveying system including the linked conveyor belt of claim 10, and further including a sprocket for rotating around a drive axis and which defines a plurality of driving areas located around the perimeter of said sprocket, each of said areas having a shape suitable for cooperating and meshing with said driving surfaces on said connecting structures.

13. The modular conveying system of claim 12 wherein said multiplicity of modules are also aligned side-by-side in brick-layed fashion to form a conveyor belt having a width which is greater than the width of a single module.

* * * * *